United States Patent [19]

Pekarik

[11] Patent Number: 4,840,980

[45] Date of Patent: * Jun. 20, 1989

[54] METHOD OF STABILIZING EPOXY-POLYAMIDE COATINGS

[75] Inventor: Alan J. Pekarik, Parma, Ohio

[73] Assignee: The Glidden Company, Cleveland, Ohio

[*] Notice: The portion of the term of this patent subsequent to Sep. 13, 2005 has been disclaimed.

[21] Appl. No.: 161,963

[22] Filed: Feb. 29, 1988

Related U.S. Application Data

[63] Continuation-in-part of Ser. No. 4,624, Jan. 15, 1987, Pat. No. 4,771,088.

[51] Int. Cl.$^4$ .................. C08K 5/19; C08L 63/00; C08L 77/08
[52] U.S. Cl. ...................... 523/456; 528/93; 528/111.3
[58] Field of Search .................. 524/249; 523/456; 528/111.3, 93

[56] References Cited

U.S. PATENT DOCUMENTS

| 2,405,965 | 8/1946 | Leekley | 524/249 |
| 2,944,036 | 7/1960 | Floyd | 528/111.3 |
| 3,382,096 | 5/1968 | Boardman | 524/249 |
| 4,189,550 | 2/1980 | Schwarze | 524/249 |

FOREIGN PATENT DOCUMENTS 60-47077  3/1985  Japan ..................... 524/249

Primary Examiner—C. Warren Ivy
Attorney, Agent, or Firm—Thomas M. Schmitz

[57] ABSTRACT

A method of rheologically stabilizing polyamide-epoxy coatings comprises the addition of an ethoxylated quaternary ammonium chloride compound to the polyamide-epoxy coating to impart post catalyzed sag resistance stability to the coating particularly when the coating is applied to upright or vertical surfaces.

4 Claims, No Drawings

METHOD OF STABILIZING EPOXY-POLYAMIDE COATINGS

BACKGROUND OF THE INVENTION

This application is a continuation-in-part of Ser. No. 004,624 filed Jan. 15, 1987, now U.S. Pat. No. 4,771,088, and the same is incorporated herein by reference.

This invention pertains to thermosetting epoxy-polyamide coatings useful in industrial or maintenance coatings, and particularly to a method of stabilizing viscosity and sag resistance properties of such coatings during the catalyzed pot life thereof which is the period after the coating composition has been catalyzed by admixture of the epoxy resin component with the polyamide component. Polyamide type coatings typically exhibit sagging, running or dripping after being applied to an upright or vertical surface substrate. Stabilizing is used in the sense that conventional prior art epoxy-polyamide coatings exhibit a loss of sag resistance after the epoxy and polyamide components are mixed. A loss in sag resistance after mixing leads to undesirable sagging, running and dripping when a conventional epoxy-polyamide coating is applied to vertical surfaces.

Prior art epoxy-polyamide compositions typically are rendered sag resistant by the addition of fumed silica or certain clays. Such additives are known as thixotropic agents, including Cab-O-Sil ® fumed silica (amorphous silicone dioxide) and Bentone ® clays (organophilic clay), which are added to thicken the coating mixtures and impart thixotropic properties to the coatings. However, sag resistance of freshly catalyzed epoxy-polyamide coatings often decrease significantly over the entire catalyzed pot life of converted or catalyzed epoxy-polyamide coating. Typically, over 50% of the initial sag resistance is lost after only half of the catalyzed pot life has elapsed. Other prior art compositions suggest the inclusion of ethylene glycol and/or glycerine to improve the rheological stability of thermosetting epoxy-polyamide compositions containing fumed silica or clay thioxtropic agents. However, only slightly improved sag resistance results along with highly detrimental viscosity increases. Illustrative comparative examples of these prior suggestions appear in the examples hereinafter.

The advantageous physical properties of thixotropic paints are ideally non-drip and splash characteristics, freedom from pigment settling, ease of brushing, and application of thick coats without danger of sagging.

It now has been found that the sag resistance of catalyzed thermosetting compositions comprising epoxy resin and aminopolyamide can be substantially stabilized over extended periods of catalyzed pot life without detrimental increase in viscosity by the inclusion of minor amounts of a cationic stabilizing material. The cationic stabilizing additive comprises an ethoxylated quaternary ammonium salt and preferably added in amounts about 1.0% by weight of the epoxy-polyamide polymer solids. This cationic stabilizer advantageously provides stable post catalyzed sag resistance at a vsicosity sufficiently low enough to obtain 75% volume solids at application viscosities. A further advantage of the cationic rheology stabilizer pertains to pigmented compositions where the inclusion of certain pigments in conjunction with the cationic stabilizer of this invention can effectively eliminate the need for inorganic thixotropic agents such as Cab-O-Sil ® fumed silica or Bentone ® clays. Still a further advantage relating to the use of cationic rheology stabilizers in accordance with this invention relates to negligible viscosity change or sag resistance over extended storage life of 4 months or more, as well as very stable viscosity and sag resistance over normal pot lifes of the catalyzed mixtures in use. These and other advantages shall become more apparent by referring to the detailed description of the invention along with the illustrative examples.

SUMMARY OF THE INVENTION

Briefly, the invention is directed to a liquid, catalyzed coating composition useful in industrial or catalyzed maintenance coatings comprising an epoxy-polyamide binder, and minor amounts of a cationic rheology stabilizer at about 0.1% and preferably above 1%, by weight of the epoxy resin and aminopolyamide polymer solids. The cationic rheology stabilizer comprises an ethoxylated quaternary ammonium chloride and preferably methylbis (2-hydroxyethyl)octadecylammonium chloride.

DETAILS DESCRIPTION OF THE INVENTION

The invention pertains to thermosetting epoxy-polyamide compositions comprising epoxy resin and aminopolyamide resin containing a cationic additive to impart stable post catalyzed sage resistance wherein the cationic additive comprises an ethoxylated quaternary ammonium salt.

Referring first to the sag resistant cationic additive in accordance with this invention, the ethoxylated quaternary ammonium comprises a material represented by the following chemical structure:

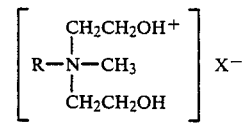

where R is an alkyl chain having between 1 and 24 carbon atoms and X is a cation selected from halide, carbonates, formates, hydroxides, nitrates, oxides, phosphates, sulphates, sulphides and similar cations. The most preferred cationic additives comprise methylbis (2-hydroxyalkyl) alkyl ammonium chloride such as methylbis (2-hyroxyethyl) octadecylammonium chloride. Accordingly, the cationic additive provides a stabilized post catalyzed sag resistance while maintaining a low enough viscosity during catalysis to enable high solids liquid catalyzed coating to be applied to a substrate. A standard test method for measuring sag resistance of paints is set forth in ASTM D4400-84.

Referring next to epoxy resins useful in the epoxy-polyamide polymer mixture, epoxy resins are polyglycidyl ethers of bisphenol A, especially those having 1,2-epoxy functionality of from about 1.3 to about 2. The molecular weight should be from about 350 to about 20,000. Molecular weights can be measured by GPC (gel permeation chromatography) according to ASTM D3016-78, D3536-76, and D3593-80. Although high molecular weight commercial epoxy resins are sometimes convenient to use, a more practical method is to start with bisphenol A and the diglycidyl ether of bispenol A, whereby the molecular weight of a liquid epoxy resin can be increased to a level that is more satisfactory for many coating applications by reacting liquid epoxy resin with additional bisphenol A or other polyalcohol materials.

The epoxy resin, ordinarily can be a mixture of monoepoxide and diepoxide. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 1 and 25 monomer units and preferably between 1 and 5 copolymerized monomer units (bisphenol-A) wherein the resulting epoxy polymer is preferably a diepoxide polymer adapted to coreact with polyamide resin in a catalyzed thermosetting mixture.

Referring next to the amino polyamide resins, polyamides are low molecular polymers containing reactive amino groups adapted to be activated and become coreactive with epoxy resin. Polyamides are polycondensation products wherein the recurring or linking unit is the amide grouping —CONH—. Many methods of producing polyamide are known although most methods are based on a dehydration reaction occurring between organic carboxylic acid and amine upon heating. For instance, heating a simple dicarboxylic acid with equal equivalents of a simple aliphatic diamine produces substantially a linear polyamide. A similar reaction can occur between monoamines and dicarboxylic acids, monocarboxylic acids and diamines, and between di- or polyamines and di- or polybasic acids. Sufficient aliphate chains between functional groups promotes polymer formation. A wide variety of polyamides are possible since these can be based on a wide variety of polyamines and polybasic acids as well as mixtures of two or more of these essential reactants. Modifications are possible in functionality as well as in number of reactants, and in addition polyamides, linear or branched, can be effectively chain-terminated by any one of a large number of monobasic acids or monoamines. The end groups in polyamide resins can be amine groups, carboxylic acid groups, or both. Lower molecular weight branched polymers on the other hand, possess a relatively large content of end groups. For example, dimer or trimer fatty acids, such as dimerized linoleic acid, can be coreacted with branched chain polyamines such as diethylene triamine. By adjusting the relative equivalents of the respective reactants, a wide range of relatively low molecular weight polyamide resins can be formulated. The reaction can be carried out in a stainless steel vessel fitted with an inert gas line, agitator and condenser. By heating together, for example, dimer acid and ethylene diamine solution in an atmosphere of nitrogen with constant agitation, water is evolved first from the ethylene diamine solution and then, as the temperature rises, from the dehydration reaction itself. Heating is continued until the temperature approaches 200° C., water being allowed to escape through the condenser. As the product becomes resinous it is checked at intervals until the desired acid value, amine number and viscosity have been reached whereupon the resulting polyamine resin can be thinned with an organic solvent if necessary to provide a fluid resin material. Polyamides useful in thermosetting compositions preferably contain at least two reactive amine groups per polymer molecule to facilitate cross-linking. Suitable plyamides typically have molecular weights up to about 10,000 and preferably between 100 and 5,000. The polyamine number (value) desirably is between 75 and 750 mg koh/gm. The free amine groups in the condensed polyamide resin provide cross-linking sites for catalytic coreaction with epoxy resin. Polyamide resin, especially those containing a branched chain strcuture and a multiplicity of primary amino end groups are particularly useful in a cross-linking reaction with epoxy resin. A wide range of weight ratios of aminopolyamide resins to epoxy resin can be utilized and advantageously can range between 15 and 200 weight parts polyamide based on 100 weight parts of epoxy resin. The catalyzed thermosetting polymeric mixture of epoxy resin and aminopolyamide contains at least 0.1% by weight of rheology stabilizing additive consisting of the ethoxylated quaternary ammonium salt and preferably above 1% and between 1% and 10% by weight based on the polymeric mixture.

The epoxy-polyamide polymeric compositions can be pigmented by grinding pigments into either or both the epoxy and polyamide resin. Useful pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, pthalocyanine green, phthalonitrile blue, ultramarine blue, cadmium pigments, chromium pigments, and the like. Filler pigments such as clay, silica, talc, mica, wollastonite, wood flour and the like can be added. Conventional thixotropic agents such as fumed silica or certain Bentone clays can be added, although an advantage of this invention is that such mineral additives are not required if the cationic stabilizer is used in accordance with this invention.

The merits of this invention are further illustrated by the following examples.

EXAMPLE 1

As a primary example of this invention, two component epoxy/polyamide coatings were prepared as follows:

| Raw Material | Epoxy/Polyamides Made with Different Thixotropes | |
|---|---|---|
| | Component 1 | Component 2 |
| | Paint A | |
| Polyamide | 30.29 | — |
| Fumed Silica Thixotrope | — | — |
| Methylbis (2-hydroxy ethyl)octadecyl Ammonium Chloride | 1.35 | — |
| TiO$_2$ | 29.92 | — |
| Talc | 26.51 | — |
| Aliphatic Solvents | 8.12 | — |
| Aromatic Solvents | 3.81 | 12.70 |
| Epoxy Resin | — | 87.30 |
| | Paint B | |
| Polyamide | 30.81 | — |
| Fumed Silica Thixotrope | — | 2.78 |
| Methylbis (2-hydroxy ethyl)octadecyl Ammonium Chloride | — | — |
| TiO$_2$ | 30.50 | — |
| Talc | 19.16 | — |
| Aliphatic Solvents | 13.23 | — |
| Aromatic Solvents | 6.30 | 10.74 |
| Epoxy Resin | — | 86.48 |

When mixed, (one volume of Component 1 with one volume of Component 2 of the respective paint) the following Leneta sag resistance values were measured during the pot life.

TABLE 1

| | Sag Resistance After Catalyzation | |
|---|---|---|
| | Leneta Sag(ASTM D-4400-84) | |
| Time after Mixing(hrs.) | Paint-A | Paint-B |
| 0 | 20 | 40 |
| 1 | 20 | 10 |
| 2 | 20 | <8 |
| 3 | 20 | — |
| 4 | 25 | — |

EXAMPLE 2

The sag resistance of freshly converted epoxy/polyamide coatings decreases significantly over the entire catalyzed pot life. With conventional thioxtropes (i.e., CAB-O-SIL ® fumed silica) or Bentones ® clays) over 50% of the initial sag resistance is often lost after only 1-2 hours into the pot life. (See Table II).

TABLE II

| | Sag Resistance After Catalyzation | | |
|---|---|---|---|
| Time After | Leneta Sag Resistance (Mils) (ASTM D-4400-84) | | |
| Mixing (Hrs.) | 2.8% CAB-O-SIL ® | 4.1% CAB-O-SIL ® | 2.2% BENTONE-SD2 ® |
| 0 | 40 (1320 cps.) | 40 (1580 cps) | 16 (2500 cps) |
| 1 | 10 | 25 | 8 |
| 2 | 8 | 8 | 5 |

See paint B in Example 1 with designated thioxtrope substitutions in component 2.

Additives such as ethylene glycol and glycerine have been used as "stabilizers" for the above mentioned thioxtropes with only little improvement. (See Table III below). Viscosity is also significantly increased.

TABLE III

| | Sag Resistance After Catalyzation vs. Time | |
|---|---|---|
| | Leneta Sag (Mils) (ASTM D-4400-84) | |
| Time After Mixing (Hrs.) | Formula B + 1% Ethylene Glycol | Formula B + 0.3% Glycerine |
| 0 | 40 | 40 |
| 1 | 25 | 30 |
| 2 | 12 | 15 |

The cationic methyl (2-hydroxyethyl) alkyl ammonium chloride component provides stable post catalyzed sag resistance at a viscosity low enough to obtain 75% volume solids at application viscosity. In addition, when this cationic compound is combined with specific pigmentation, it can eliminate the need for any CAB-O-SIL ® fumed silica or Bentone ® clay and is quite economical. The effective level is a minimum of 9 lbs./100 gal., and is very stable during storage, showing little change in viscosity or sag resistance over a period of 4 months. (See Table IV).

TABLE IV*

| Stormer | Initial | 4 Months (Ambient) | 4 Months @120° F. |
|---|---|---|---|
| Viscosity | 123 KU | 124 KU | 20 KU |
| Catalyzed Leneta Sag Resistance (Mils) ASTM D-4400-84 | 20 | 20 | 20 |

*1.3% Ethoxylated Quarternary Ammonium Chloride (See Paint A).

The foregoing describes a stabilized thioxotropic composition but is not intended to be limiting except as defined in the appended claims.

I claim:

1. In a method of stabilizing thermosetting epoxy/polyamide coating composition, the improvement comprising:
   providing a polymeric mixture of an amino-functional polyamide resin and an epoxy resin adapted to coreact to form a thermoset polymer where the polymeric mixture contains at least 0.1% by weight of a rheology stabilizing additive consisting of an ethoxylated quaternary ammonium salt based on the weight of the polymeric mixture;
   where said stabilizing additive provides stabilized viscosity and sag resistance of the polymeric mixture during the catalyzed pot life of the polymeric mixture.

2. The method in claim 1 wherein between 1% and 10% by weight stabilizing additive is added to the polymeric mixture.

3. A stablized, thermosetting epoxy/polyamide coating composition comprising a polymeric mixture of an aminopolyamide and an epoxy resin adapted to coreact to form a thermoset polymer where the polymeric mixture contains at least 0.1% by weight of a stabilizing additive consisting of an ethoxylated quaternary ammonium salt of the generalized formula:

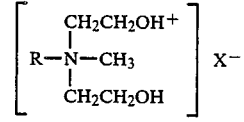

wherein R is an alkyl chain having between 1 and 24 carbon atoms;
   wherein X is a cation selected from a halide, carbonate, formate, hydroxide, nitrate, oxide, phosphate, sulphate, ad sulphide;
   where said stabilizing additive stabilizes the viscosity and sag resistance of the polymeric mixture during the catalyzed pot life of the polymeric mixture.

4. The composition in claim 3 wherein the stabilizing additive comprises between 1% and 10% of the polymeric mixture.